United States Patent [19]

Wurst

[11] 3,872,808
[45] Mar. 25, 1975

[54] SEWING MACHINE STITCH PATTERN SELECTION FROM DATA STORED IN A MULTIPLE PATTERN STATIC MEMORY

[75] Inventor: John W. Wurst, Dover, N.J.

[73] Assignee: The Singer Company, New York, N.Y.

[22] Filed: July 5, 1973

[21] Appl. No.: 376,781

[52] U.S. Cl. .................... 112/158 E, 112/121.11
[51] Int. Cl. .................................... D05b 3/02
[58] Field of Search ...... 112/121.11, 121.12, 158 R, 112/158 A, 158 B, 158 E; 66/50 R

[56] References Cited
UNITED STATES PATENTS
3,005,136 10/1961 Flückiger .................. 112/158 E X
3,076,066 1/1963 Caron ....................... 112/158 E X

FOREIGN PATENTS OR APPLICATIONS
1,961,102 9/1971 Germany ........................ 66/50 R

Primary Examiner—Werner H. Schroeder
Attorney, Agent, or Firm—R. E. Smith; M. J. Breen; C. A. Williams, Jr.

[57] ABSTRACT

A system is disclosed in which a plurality of sewing machine stitch patterns are stored in a static memory. Digital information related to the positional coordinates for each stitch of a plurality of stitch patterns is stored in a static memory. Each stitch pattern is automatically obtained upon activation of an operator actuated pattern selector switch which generates a digital code representative of the pattern selected. The pattern code word is latched and coupled to an address memory which provides a continuous fixed output of a digital code representative of the first word (stitch) in the selected pattern. The address memory is coupled to a counter which counts the pulses provided by a pulse generator which is driven in timed relation with the sewing machine drive shaft. The signal pulses are counted up in the counter to provide a timed series of progressively increasing binary numbers corresponding to the progressively increasing number of stitches in the pattern. The counter output is coupled to and functions as the address to the pattern memory which provides a digital output therefrom with information related to the positional coordinates for each stitch of a selected pattern. The output of the memory is coupled to an actuating means operatively connected to impart a controlled range of movement to the conventional stitch forming instrumentality of the sewing machine to produce a specific predetermined position coordinate for the needle penetration during each stitch formation. A unique code word is provided from the pattern memory output upon the completion of a selected pattern. This end of pattern code word is coupled to the address counter and resets it to the address originally coupled thereto thus, providing a continuously repeating stitch pattern.

7 Claims, 3 Drawing Figures

ENCODED DATA

ARROWHEAD PATTERN

| ADDRESS | BIGHT POSITION COORDINATE | CODE | FEED INCREMENT | CODE | PATTERN |
|---|---|---|---|---|---|
| 0 | 0 | 0 1 1 1 1 | +.100 | 0 0 1 1 1 | |
| 1 | -8 | 0 0 1 1 1 | +.100 | 0 0 1 1 1 | |
| 2 | +8 | 1 0 1 1 1 | +.100 | 0 0 1 1 1 | |
| 3 | -7 | 0 1 0 0 0 | +.100 | 0 0 1 1 1 | |
| 4 | +7 | 1 0 1 1 0 | +.100 | 0 0 1 1 1 | |
| 5 | -6 | 0 1 0 0 1 | +.100 | 0 0 1 1 1 | |
| 6 | +6 | 1 0 1 0 1 | +.100 | 0 0 1 1 1 | |
| 7 | -5 | 0 1 0 1 0 | +.100 | 0 0 1 1 1 | |
| 8 | +5 | 1 0 1 0 0 | +.100 | 0 0 1 1 1 | |
| 9 | -4 | 0 1 0 1 1 | +.100 | 0 0 1 1 1 | |
| 10 | +4 | 1 0 0 1 1 | +.100 | 0 0 1 1 1 | |
| 11 | -3 | 0 1 1 0 0 | +.100 | 0 0 1 1 1 | |
| 12 | +3 | 1 0 0 1 0 | +.100 | 0 0 1 1 1 | |
| 13 | -2 | 0 1 1 0 1 | +.100 | 0 0 1 1 1 | |
| 14 | +2 | 1 0 0 0 1 | +.100 | 0 0 1 1 1 | |
| 15 | -1 | 0 1 1 1 0 | +.100 | 0 0 1 1 1 | |
| 16 | +1 | 1 0 0 0 0 | +.100 | 0 0 1 1 1 | |
| 17 | 0 | 0 1 1 1 1 | +.100 | 0 0 1 1 1 | |
| 18 (REPEAT) | 0 | 1 1 1 1 1 | | | |

GREEK KEY PATTERN

| ADDRESS | BIGHT POSITION COORDINATE | CODE | FEED INCREMENT | CODE | PATTERN |
|---|---|---|---|---|---|
| 34 | -15 | 0 0 0 0 0 | 0 | 1 0 0 0 1 | |
| 35 | 0 | 0 1 1 1 1 | 0 | 1 0 0 0 1 | |
| 36 | +15 | 1 1 1 1 0 | +.100 | 0 0 1 1 1 | |
| 37 | +15 | 1 1 1 1 0 | +.100 | 0 0 1 1 1 | |
| 38 | +15 | 1 1 1 1 0 | 0 | 1 0 0 0 1 | |
| 39 | 0 | 0 1 1 1 1 | -.060 | 1 0 1 1 1 | |
| 40 | 0 | 0 1 1 1 1 | 0 | 1 0 0 0 1 | |
| 41 | -15 | 0 0 0 0 0 | +.160 | 0 0 0 0 1 | |
| 42 (REPEAT) | -15 | 1 1 1 1 1 | | | |

OVEREDGE STRETCH PATTERN

| ADDRESS | BIGHT POSITION COORDINATE | CODE | FEED INCREMENT | CODE | PATTERN |
|---|---|---|---|---|---|
| 248 | -15 | 0 0 0 0 0 | +.110 | 0 0 1 1 0 | |
| 249 | +15 | 1 1 1 1 0 | +.110 | 0 0 1 1 0 | |
| 250 | -15 | 0 0 0 0 0 | -.080 | 1 1 0 0 1 | |
| 251 | -15 | 0 0 0 0 0 | +.080 | 0 1 0 0 1 | |
| 252 | -15 | 0 0 0 0 0 | +.080 | 0 1 0 0 1 | |
| 253 | -15 | 0 0 0 0 0 | -.080 | 1 1 0 0 1 | |
| 254 (REPEAT) | -15 | 1 1 1 1 1 | | | |

STRAIGHT STITCH

| ADDRESS | BIGHT POSITION COORDINATE | CODE | FEED INCREMENT | CODE | PATTERN |
|---|---|---|---|---|---|
| 256 | 0 | 0 1 1 1 1 | +.080 | 0 1 0 0 1 | |
| 257 (REPEAT) | 0 | 1 1 1 1 1 | | | |

Fig. 3

SEWING MACHINE STITCH PATTERN SELECTION FROM DATA STORED IN A MULTIPLE PATTERN STATIC MEMORY

BACKGROUND OF THE INVENTION

Systems are known in the prior art wherein sewing machine stitch related information, which may include multiple stitch patterns, is stored on a record sheet of paper or magnetic tape that is arranged to move past a read-out head synchronously with the sewing machine drive. But, so far as we are aware, these systems have not been successful because of the complexity of the system and the large amounts of space required for storing the multiple patterns which would normally be required in a practical sewing machine. The reliability of a mechanical driving system with electronic or pre-punched paper tape sensors has been proven to be inadequate.

SUMMARY OF THE INVENTION

In order to overcome the shortcomings found in the prior art, the present invention comprehends a static memory system which in a preferred embodiment is implemented with a solid state semi-conductor integrated circuit arrangement and is included within the frame of a sewing machine. By use of a pattern selection mechanism multiple patterns stored in a static memory are recovered upon command of an operator. The static memory is operatively connected to an actuating mechanism which controls the needle position for each penetration of the material. The present system does not require the use of a mechanically moving memory for an information storage device but uses a static high density information storage system.

A multiple pattern sewing machine having instrumentalities for forming a succession of stitches individually placed in a selected one of a plurality of different patterns in accordance with the principles of the present invention includes; static memory means in which a multiplicity of separate digital code words are stored in a predetermined sequence with each word corresponding to one individually placed stitch in a pattern, plural switch means arranged accessible to a sewing machine operator on the sewing machine, each of the switch means is coupled to the static memory means for selectively rendering effective a specifically different portion of the multiplicity of separate digital code words to form a pattern, means for providing timing pulses related to the formation of successive stitches formed by the sewing machine, counter means coupled to the static memory means and utilizing the timing pulses for addressing the specific portion of the code word rendered effective by the switch means in the predetermined sequence, and actuating means coupled to the static memory means and operatively connected to the stitch forming instrumentalities and responsive to the sequence of digitally coded words for influencing the stitch forming instrumentalities to form a pattern in response thereto.

BRIEF DESCRIPTION OF THE DRAWINGS

Further objects and advantages of the present invention will become apparent from the following detailed description of a preferred embodiment thereof taken in conjunction with the following drawings wherein.

DESCRIPTION OF THE PREFERRED EMBODIMENT

Figure 1:
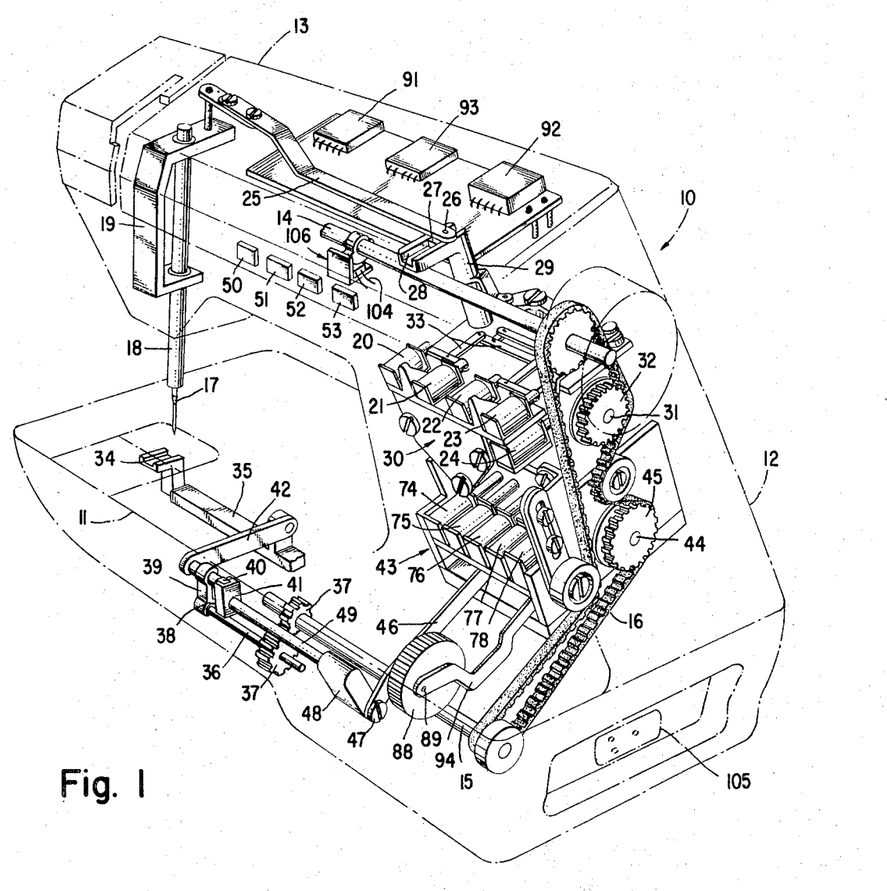
FIG. 1 is a perspective view of a sewing machine partially broken away in which the preferred embodiment of the invention is incorporated.

FIG. 1 of the drawings illustrates a sewing machine with fragments of two actuating mechanisms thereon, the needle bight and the work feeding mechanism, which can contribute to changes in the relative coordinates of successive needle penetration in the work. FIG. 1 also includes a representation of the salient physical elements necessary to effect the selection of one of a multiple of stitch patterns in accordance with this invention.

As shown in phantom lines in FIG. 1, a sewing machine casing 10 includes a bed 11, a standard 12 rising from the bed and a bracket arm 13 overhanging the bed. The driving mechanism of the sewing machine includes an arm shaft 14 a bed shaft 15 interconnected by a timing belt 16 in the standard. A needle 17 is carried for endwise reciprocation by a needle bar 18 mounted for lateral jogging movement in a gate 19 in the bracket arm 13. Any conventional connections (not shown) may be used between the arm shaft and the needle bar for imparting needle reciprocation. A drive link 25 is pivoted as at 26 to a block 27 arranged in a radial guide slot 28 of an oscillating driver 29 forming a part of an electromechanical actuator indicated generally at 30 for influencing the lateral jogging or bight. One such actuator which may be used in this invention is that shown and described in U.S. Pat. application Ser. No. 347,982, filed Apr. 4, 1973 and assigned to the same assignee as the present invention, which is incorporated by reference herein. For an understanding of the present invention it is sufficient to understand that the actuator 30 includes the drive shaft 31 carrying a sprocket 32 engaging the timing belt 16. A whippletree linkage 33 which is connected to the driver 29 is shifted alternatively back and forth by the drive shaft 31 and a selective position of the driver within the range of drive shaft imparted motion may be maintained during needle penetration by the selective energization of five solenoids 20, 21, 22, 23 and 24.

Also illustrated in FIG. 1 is a fragment of a work feeding mechanism including a feed dog 34 carried by a feed bar 35. In FIG. 1 the mechanism is illustrated imparting work transporting movement to the feed dog including the feed drive shaft 36 driven by gears from the bed shaft, a cam 38 on the feed drive shaft, a pitman 39 bracing the cam 38 and connected to reciprocate a slide block 39 and a slotted feed regulating guideway 40. A link 42 pivotably connects the pitman 39 with the feed bar 35 so that depending upon the inclination of the guideway 41, the magnitude and direction of the feed stroke of the feed dog will be determined.

The inclination of the guideway 41 in the present invention may be controlled by an electromechanical feed actuator indicated generally at 43. The actuator 43 may also be built in accordance with the U.S. Pat. application Ser. No. 347,982 referred to above, and may include a drive shaft 44 carrying a sprocket 45 engaging the timing belt 16. A whippletree linkage (not shown) which is shifted alternately back and forth by the drive shaft 44 is connected to a link 46 pivoted at 47 to a rock arm 48 carried on a rock shaft 49 secured to the guideway 41. A selected position of the whippletree linkage, and therefore of the link 46 may be maintained during the active work feeding stroke by the selective energization of five solenoids 74, 75, 76, 77 and 78. A dial 88 on the machine bed is provided with a crank pin 89 embraced by an adjusting link 94 which extends into the feed actuator 43 to provide for a balanced control. Preferably the balance control provides for a mechanical fine adjustment between the whippletree linkage connection and the guideway 41 so that the intended stitch length and directions can be accurately attained.

In the preferred embodiment, the bracket arm is provided with four selector switches 50, 51, 52 and 53 which are used by the operator to select one of the ornamental stitch patterns stored in the memory or, alternatively, to obtain a straight stitch. The obtaining of straight stitch operation is accomplished by activation of selector switch 50 whereas pattern No. 1 is associated with selector switch 51, pattern No. 2 is associated with selector switch 52, and pattern No. 3 is associated with selector switch 53. The operation of switches 50–53 and the method of obtaining the proper address code for the selected pattern will be discussed hereinafter.

A typical pulse generator 106 suitable for use in the present system must be capable of providing a pulse relative to the position of the sewing machine drive shaft. One such pulse generator is shown and described in the U.S. Pat. Application Ser. No. 364,836 filed May 29, 1973 and, assigned to the same assignee as the present invention. Reference may be made to this application for a more complete understanding of the operation of this type of pulse generator.

A binary address counter 93 is connected to the pulse generator 106, via a lead 104, and functions to count the pulses therefrom. The counter 93 of the preferred embodiment is solid state, has a capacity of 512 bits and is capable of counting the complete range if necessary. However, as will be explained hereinafter, by providing a code word which indicates the end of a selected pattern the counter is capable of being reset automatically to the first stitch of the selected pattern thereby repeating the pattern indefinitely until a new pattern is selected by an operator. The binary output from the counter 93 is applied as an address input to the integrated logic circuit memory, which hereinafter will be referred to as the pattern "ROM" 92 and is coded to provide a specific binary output signal for each different address input signal. As will become apparent, the encoding is such that an actuator such as those indicated at 30 and 43, FIG. 1, operatively connected to the stitch forming instrumentality and controlled by the memory output establish the coordinates of the needle penetration of each stitch in accordance with the predetermined pattern design. It is sufficient for the purposes of the present invention to note that the amount of output movement applied to the sewing machine bight and/or feed regulator is controlled by the selective energization of five solenoids incorporated within each of the actuating means. Preferably the amount of output movement contributed by each solenoid of the actuator is weighted or given significance according to the common binary 8, 4, 2, 1 code. Thus, if each solenoid is driven by the memory output line having the same bit significance as output movement significance, the binary number is stored in the memory and is converted by the actuator directly into movement proportional to the decimal equivalent of the binary number.

The power for operation of the driving mechanism which is introduced at receptacle 105 may be conventional house current and is converted to 5 volts in a conventional manner for use by the integrated circuit modules 91, 92 and 93. The power to operate the solenoids used in the actuating means for both bight and feed is also obtained in a conventional manner, via a receptacle 105, and may include the use of a transformer and rectifiers (not shown).

Figure 2:
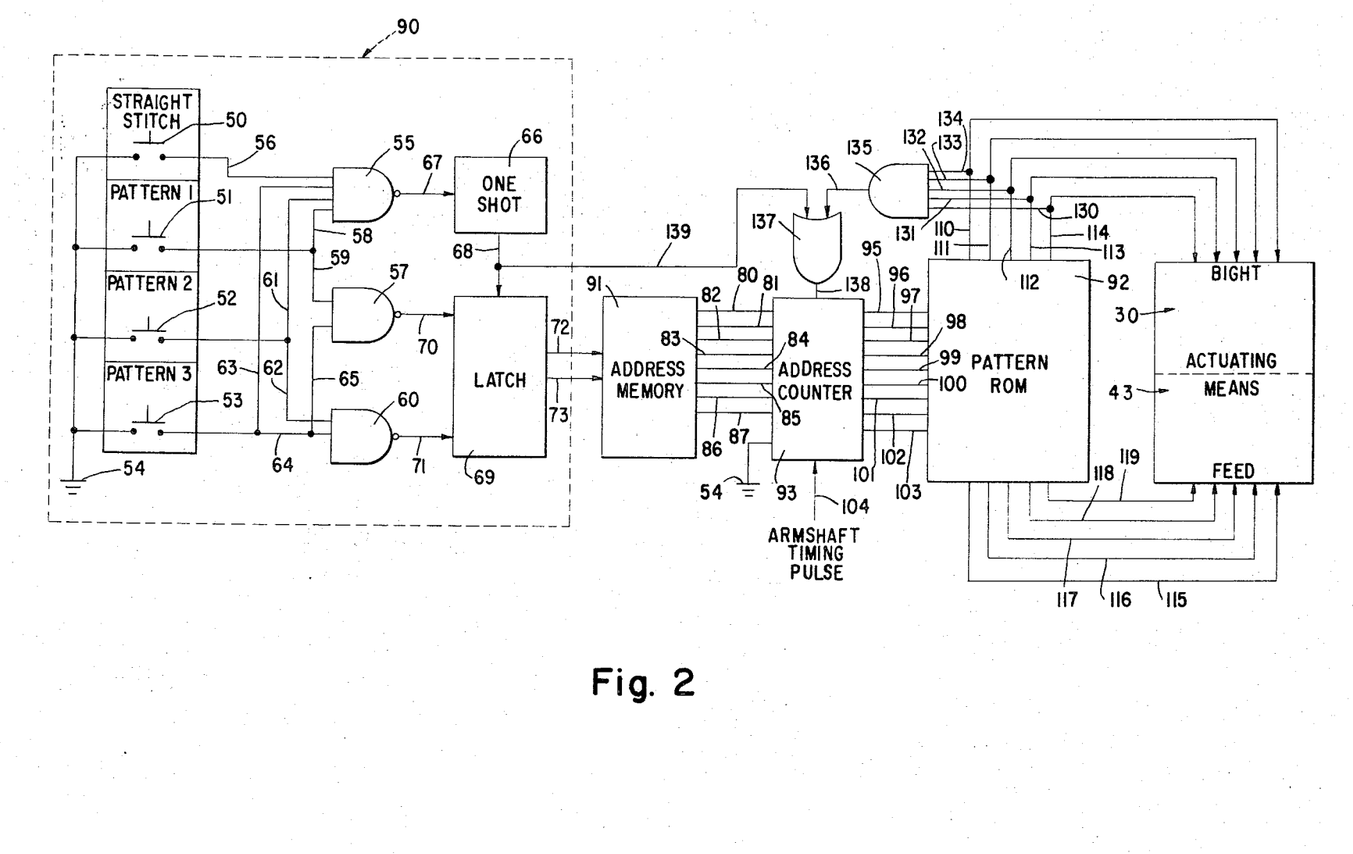
FIG. 2 is a functional block diagram of the preferred embodiment of the invention shown in FIG. 1.

Referring now to FIG. 2, which shows a functional block diagram of the preferred embodiment of the invention. A pattern selector means 90 which is incorporated preferably on the body of the sewing machine includes four (4) push-button type selector switches 50, 51, 52 and 53. Selector switch 50 is associated with obtaining a conventional straight stitch. Switches 51, 52 and 53 are associated with the selection of ornamental stitch patterns No. 1, 2 and 3, respectively, as mentioned earlier. One side of each of these switches is connected to a ground reference terminal 54. The other side of switch 50 is connected to a conventional NAND gate 55. The other side switch 51 is connected to NAND gate 55 and NAND gate 57, via leads 58 and 59 respectively. The other side of switch 52 is connected to NAND gate 55 and NAND gate 60, via leads 61 and 62 respectively. Switch 53 is connected to NAND gate 55, via a lead 63, NAND gate 60, via lead 64, and NAND gate 57 via a lead 65.

The output of NAND gate 55 is connected to the input of a one shot multivibrator 66, via a lead 67; the output of the one shot 66 is connected, via a lead 68, to a latch 69. The outputs of NAND gates 57 and 60 are also coupled to the input of latch 69, via leads 70 and 71. A pulse appearing on line 68 from the one shot 66 will cause the signal appearing on lines 70 and 71 to provide a continuous output from the latch on output lines 72 and 73. The NAND gates 55, 57 and 60, one-shot multivibrator 66 and latch 69 are conventional integrated circuit modules which are commercially obtainable. The signal voltage (0 or +5) represents a digital code in a conventional manner wherein a binary zero is generated for 0 voltage and a binary 1 is generated for a +5 voltage. Thus, a pattern selector code word appearing on lines 72 and 73 is coupled to the address memory 91 which provides on output lines 80 through 87 a code word representing the pattern selected. The address memory 91 may be purchased commercially from the Signetics Corporation as Model No. 8223 and is programmed in a conventional manner to obtain the required code.

It is to be noted that the operational B+ voltage (+5) has not been indicated on the block diagram for convenience. It is to be understood that the required B+ voltage is provided in a conventional manner by those familiar with the state of the art and that NAND gates 55, 57 and 60 are biased to a high or 1 state in a conventional manner by a resistance, not shown for clarity, coupled to the B+ voltage.

The address counter 93 has connected thereto the input lines 80 through 87 from the address memory 91 which determines the starting point of the counter. The address counter 93 has a count-up input line 104 which provides pulses from the arm shaft pulse generator 106 as shown in FIG. 1. Output lines 95, 96, 97, 98, 99, 100, 102 and 103 are connected to the inputs of the pattern read only memory (ROM) 92. The read only memory is implemented by a Signetics Model No. 82S26 logic integrated circuit which is a conventional ROM having the output lines 110, 111, 112 113 and 114 which provide the digital code word for the bight actuating means 30 and the lines 115, 116, 117, 118 and 119 which provide the digital code word for the feed actuating means 43. The bight actuating means 30 and the feed actuating means 43 are similar in construction and are adapted to convert a digital code word into a mechanical position which locates the sewing machine needle in a conventional stitch forming instrumentality and provides a specific work feed for each needle penetration. It will be understood that when actuating means is referred to it incorporates both the bight and feed actuating means 30 and 43 hereafter, and may include a latching means, not shown, if required. As will become apparent later the encoding of the digital word is such that an actuating means operatively connected to the stitch forming instrumentality of the sewing machine and controlled by the pattern ROM 92 establishes the coordinates for the needle penetration of each stitch in accordance with the predetermined pattern selected. One such driving device which may be used in the system of this invention is the whippletree actuator shown and described in U.S. Application Ser. No. 347,982 mentioned earlier. Reference may be made to this application for a more complete understanding of the operation of this actuating means. It is sufficient for the purpose of the present invention to note that the amount of output movement applied to the sewing machine bight and/or feed adjustment is controlled by the selective energization of five solenoids 20, 21, 22, 23 and 24; or 74, 75, 76, 77 and 78.

Additionally included in the pattern ROM 92 is an end indicating word which denotes the end of each selected pattern. In the preferred embodiment of the invention the code word was chosen to be 11111. When this binary digital code is coupled, via lines 130, 131, 132, 133 and 134 to the input of AND gate 135 and output is provided from AND gate 135 which is connected, via line 136 to OR gate 137. The output of OR gate 137 is connected to the reset input of address counter 93, via line 138. Thus, the address counter will be reset each time the end word code is generated by the pattern ROM. An additional input to OR gate 137 is obtained from the output of one shot 66 and is connected, via lead 139, and provides for resetting the address counter 93 each time any ornamental stitch pattern or straight stitch is selected by the operator.

Figure 3:
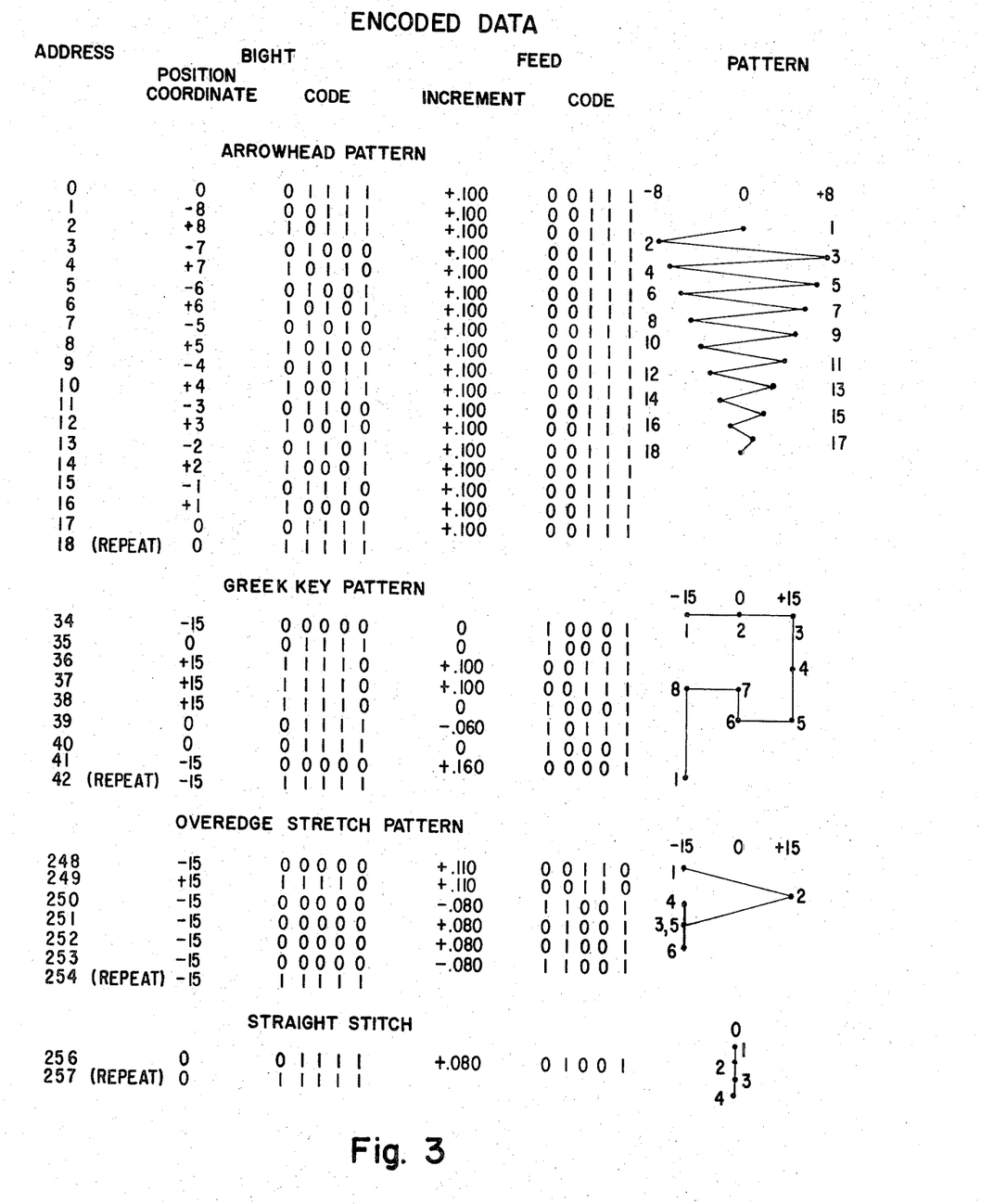
FIG. 3 is a table of encoded data for the production of three different ornamental stitch patterns, and a straight stitch with a pictoral representation of the pattern alongside each and including the bight and feed information and pattern selection words expressed in both decimal and binary code as typically encoded in the static memories.

The address memory 91 is permanently encoded in a conventional manner so that any binary number presented on its address lines 72 and 73 will produce a predetermined specific binary number on output data lines 80 through 87 which is representative of the particular pattern selected. The address counter, in response to a pulse on line 138, is loaded with the binary number presented on the input lines 80 through 87 including the zero bit supplied by ground 54 and will count up from that number in response to timing pulses on the count-up input line 104, the result appearing on output data lines 95–103. The table of encoded data for both pattern address and individual stitch patterns which is shown in FIG. 3 specifically discloses the encoding placed in the pattern ROM 92 to obtain the typical patterns shown. It is to be noted that the address memory provides only the address of the first code word of a stitch pattern which represents the first needle penetration of that pattern and remains latched in that condition until a different pattern is selected. An input pulse occuring from the arm shaft timing generator 106 and coupled to the address counter, via line 104 causes the counter to move up one count for each pulse, thereby causing the next successive code word to appear on lines 95–103. This causes an output from the pattern ROM 92 to appear on output data lines 110–114 for each successive needle penetration and provides an output on lines 115 through 119 which is utilized by the feed actuating means in between each needle penetration.

Instead of utilizing the special end code words in the pattern ROM 92 for determining the number of stitches in each pattern as illustrated in the drawings and discussed above, information delineating the number of stitches in each pattern might be stored in other places in the system, for instance, in the address memory 91. Such end of pattern information might be stored in the address memory in the form of the address of the last word in each pattern in which case an additional element in the form of a comparator would be required responsive to an output of the address counter 93 identical to the programmed last word address in the memory 91 for producing a resetting pulse in the line 138. If such end of pattern information were to be stored in the address memory in the form of a number representation of the number of stitches in each particular pattern, an additional element in the form of a counter would be required responsive to that preselected number of timing pulses in line 104 for producing a resetting pulse in the line 138. Since the alternatives discussed in this paragraph are representative of many variants which may suggest themselves in the light of applicant's disclosure, these alternatives are not specifically illustrated in the accompanying drawings.

The operation of the pattern selection and systems logic and digital codes as shown in FIG. 3 will now be described to show how any one of the multiple patterns available in the pattern ROM 92 may be obtained. The ornamental stitch patterns selected have been chosen for illustrative purposes only, and are: the Arrowhead pattern, the Greek Key pattern, and the Overedge Stretch Stitch pattern. It will be noted that the Arrowhead pattern consists of 18 needle penetrations of uniformly decreasing bight on each side of center and requires a fixed constant feed between each stitch. At the end of the Arrowhead pattern a repeat code word, which in the preferred embodiment was chosen to be 11111 instantaneously resets the counter to its first stitch position.

As shown in the table of encoded data of FIG. 3, there are 15 possible equal bight positions on each side of center needle. The bight is initially adjusted so that, with no signal to the actuator 30 (solenoids) the needle is set at extreme left of center or at coordinate −15. Since the coordinate position for the first stitch of the Arrowhead pattern, for example, is at needle center or coordinate 0 the actuator must shift the bight 15 units to the right. To accomplish this the memory must present a binary member to the solenoids equal to the decimal 15, in the code chosen, this is 01111.

It is to be noted, that in the system described the pattern ROM 92 incorporates a plurality of different patterns of which three typical pattern arrangements have been displayed in FIG. 3. The patterns which are disclosed herein have been selected because they are exemplary of different control requirements. These disclosed patterns are the Arrowhead pattern, which utilizes constant feed and variable bight information, a Greek Key pattern, which utilizes variable feed and variable bight information, and an Overedge Stretch Stitch pattern which also uses both variable feed and variable bight information.

For operation of a suitable bight or feed actuating means reference may be made to the U.S. Pat. Application Ser. No. 347,982, filed Apr. 4, 1973 mentioned earlier. It is sufficient for the present discussion to note that the output lines 110 through 114 and 115 through 119 of the pattern ROM 92 provide either a 0 (grounded) or a 1 (+5 volts) in accordance with the information stored therein and the address code appearing on input lines 95 through 103.

In the system to be described it is to be noted that the information stored in the pattern ROM is fed to the actuating means during the time the needle is reciprocated out of material and in time so that the new needle coordinate position is established for each stitch before the needle penetration next begins. This is readily accomplished by adjusting the pulse generator 106 so that the output pulse therefrom can be made to occur during the time the needle is withdrawn from the material. The logic circuits are practically instantaneous in operating speed and the solenoids can be made to have small pick-up and drop-out times so that this adjustment is not critical. The bight code information is fed to the actuating means prior to the needle penetrating the material and the feed code information is applied to the feed actuating means sometime after the needle has been removed from the work material. Thus, the encoded data shown in FIG. 3 may be read and the pattern duplicated by understanding that the penetration or bight code is applied first, therefore locating the position of the needle when penetrating the work and when the needle leaves the work the feed code increment will govern the amount of feed the work is to be given.

The end of pattern word known as "repeat or recycle" has the digital code of 11111 and resets the address counter 93 instantaneously so that the bight code is reset to the code word for the first stitch of the pattern, thereby providing a continuously repeating pattern. In the preferred embodiment of the invention the repeat code is the same for any of the three patterns shown.

The Straight Stitch is accomplished by addressing the first stitch and a fixed feed increment of +0.08 and then providing, at the next revolution of the arm shaft, the pulse code of 11111 which repeats the first stitch for one arm shaft revolution (1 pulse count) when the repeat code appears again thereby repeating the cycle continuously.

It is to be noted that, with switches 50, 51, 52 and 53 in their open position, all inputs to NAND gates 55, 57 and 60 are high (binary 1) thus yielding a low (binary 0) on output lines 67, 70 and 71. When a circuit is completed to reference ground 54, one input of a respective NAND gate goes to binary 0 and its output goes to binary 1.

An operator selecting any stitch pattern by depressing switch 50, 51, 52 or 53 will provide a 0 to 1 input of NAND gate 55 and cause the one shot 66 to provide an output pulse. The length of this pulse need only be slightly longer than the total delay times of the latch 69, the address memory 91 and the address counter 93 to insure that the counter is loaded with the correct address of the first word of the newly chosen pattern. The latch code is determined by NAND gates 57 and 60 and may be generated as described hereinafter.

In the preferred embodiment to obtain a straight stitch a 0 input on line 56 is obtained by depressing the switch 50. Since all inputs are applied to NAND gates 57 and 60 are high, lines 70 and 71 are at 0 and the output from the latch 69 appearing on lines 72 and 73 is 00. For this input address of 00 the output of the address memory 93 provides the digital code of 100000000 on lines 80–87 which is loaded into the address counter 93. The address counter 93 provides the code 100000000 on output lines 95–103 which, in the preferred embodiment corresponds to the memory position number or address of 256. The address code 256 coupled to the pattern ROM 92 on lines 95–103 will provide an output code word of 01111 on lines 110 through 114 which will provide a position coordinate for needle center or 0. Simultaneously, code 01001 is provided on lines 115 through 119 which corresponds to a feed throw of +0.080. With the arm shaft revolving, a timing pulse is coupled, via line 104, to the address counter 93 which advances one count providing a code word 100000001 to the pattern ROM 92 which corresponds to address 257. Since the pattern ROM 92 is preprogrammed to provide a code word of 11111 for position 257, code word 11111 appears on lines 110–114 which is the repeat code signal.

Depressing pattern switch 51 provides a 0 on line 59, thus the input to NAND gate 57 is a 0 and a 1 yielding an output of 1. NAND gate 60 having a 1 on line 64 and a 1 on line 62 provides an output on line 71 which is a 0. With a digital code of 10 appearing respectively on lines 70 and 71 latch 69 provides a 10 output on lines 72 and 73 respectively. The output of address memory ROM 91 with an input code of 10 has been programmed to provide, on lines 80 through 87 respectively, the digital code 00000000. The address counter 93 with a digital code 00000000 appearing on lines 80–87 provides on lines 95 through 103, respectively, the digital code of 000000000 which is its initial or first stitch condition. This corresponds to the address number 0 and is the address for the Arrowhead pattern as shown in FIG. 3. The timing pulses appearing on line 104 which correspond to revolutions of the arm shaft 14 of the sewing machine cause the counter to advance one increment with each revolution, thereby providing an increasing increment to the address counter 93 which provides the output codes shown in FIG. 3 to the pattern ROM 92 and, thereby, sequentially positioning the needle in accordance with the code information. Thus, the pattern shown in FIG. 3 for the Arrowhead will be generated in 18 stitches. The pattern may be readily visualized by noting that the needle penetration or bight position occurs just prior to the needle entering the work and the increment listed in FIG. 3 for the feed occurs after the needle has left the work and prior to the next needle penetration.

Depressing pattern selector switch 52 will cause the sewing machine to generate the Greek Key pattern by providing a 0 on line 62. Since line 64 has a 1 thereon, the output from NAND gate 60 appearing on line 71 is a 1. The output from NAND gate 57 is a 0 on line 70, since its input is a 1 on line 59 and a 1 on line 65. A 01 on lines 70 and 71 generates a 01 on output lines 72 and 73 respectively of latch 79. With a 01 code entering the address memory 91, the memory provides an output code on lines 80–87 corresponding to 00010001 which occupies the position corresponding number 34 in the preferred embodiment. With this digital code appearing on lines 80 through 87, respectively, the address counter provides an output on lines 95 through 103 respectively, of 000100010 causing the pattern ROM to provide an output of 0000010001 on lines 110–114 and lines 115–119 respectively, which is the first stitch in the Greek Key pattern. The first 5 bits of the code word is coupled from the pattern ROM 92 to the actuating means 30 which provides the bight position of the needle. The second 5 bits of the code word is coupled to the actuating means 43 which provides the feed information for the pattern. In a like manner the timing pulse being coupled into the address counter 93 via line 104 increases the count one increment for each revolution of the arm shaft, thereby, providing an input to the pattern ROM of an increasing increment with each revolution yielding the output as shown in FIG. 3 under the Greek Key pattern.

Pattern No. 3 is selected by depressing switch No. 53 providing a 0 on line 64. Since a 1 appears on line 62 the output from NAND gate 60 is a 1 which is coupled, via line 71, to the latch. Line 65 also goes to 0 and, since line 59 has a 1 on it, the output from NAND gate 57 is also a 1, thereby a logic 1 appears on both lines 70 and 71 causing the latch 69 to provide an output logic code of 11 on line 72 and 73, respectively. Connecting a pattern code 11 into the address memory 91 yields an output code of 01111100 on lines 80 through 87. This code corresponds to position 248 in the pattern memory 92 and is the address of the Overedge Stretch Stitch pattern. The output of the pattern ROM 92 is programmed to provide an output code of 0000000110 for the input code selected, which corresponds to the first stitch of the pattern and is shown in FIG. 3. As described earlier, the timing pulse causes the address counter 93 to advance one increment with each revolution of the arm shaft, thereby providing the output codes as shown in FIG. 3, which generates the Overedge Stretch Stitch pattern.

In the preferred embodiment of the invention the last code word output of a pattern is selected to be 11111. When this position in the memory is reached, instantly AND gate 135 provides an output on line 136 to OR gate 137 which provides an output pulse, via line 138, to the address counter 93 thereby, causing the counter 93 to reset to the address being steadily supplied by the address memory 91, via lines 80 through 87. As the counter resets, the pattern ROM 92 outputs revert to the code for the first bight and feed word corresponding to the pattern address, the special recycle code disappears, and the load input signal to the counter returns to the normal locked or counting condition.

In the example described hereinbefore a pattern ROM was assumed to be capable of storing 512 words; thus 9 address bits are required. Because the address memory provides an output of only 8 bits, the ninth and least significant input bit is always 0 (grounded). With this arrangement the only limitation is that each pattern starts on an even word number. In the preferred embodiment this technique was employed. However, this technique is not crucial to the concept of the present invention.

While the specific form of a pattern selector switch is shown herein for converting the mechanical information into an electrical pulse code in accordance with the pattern selected, it will be understood that the present invention is not so limited, but includes within its scope any type of mechanical to electrical device wherein a coded electrical signal is provided.

Hereinbefore has been disclosed a system wherein a static memory device is utilized to store information corresponding to each stitch of a plurality of patterns. Each pattern arrangement may be recovered upon demand of an operator by actuating a pattern selector switch. A digital code representative of the pattern selected is generated thereby, latched and coupled to an address memory which provides a continuous fixed output of a digital code representative of the first word of the selected stitch pattern. The address memory is coupled to a pattern ROM, via an address counter which is caused to advance an increment responsive to the rotation of the arm shaft, and provides information related to each stitch of the selected pattern. This information is coupled to an actuating means which positions the needle and determines the point of penetration into the work and also provides the proper feed to generate the pattern selected.

Having thus set forth the nature of the invention, what is claimed herein is:

1. A multiple pattern sewing machine having instrumentalities for forming a succession of stitches individually placed in a selected one of a plurality of different patterns, said sewing machine including:
   a. static memory means in which a multiplicity of separate digital code words are stored in a predetermined sequence with each word corresponding to one individually placed stitch in a pattern;
   b. plural switch means arranged accessible to a sewing machine operator on said sewing machine, each said switch means coupled to said static memory means and effective when actuated individually to impress on said static memory a signal identifying as a starting word in a pattern any specific one of said multiplicity of separate digital code words which correspond to individually placed stitches;
   c. means for providing timing pulses related to the formation of successive stitches formed by said sewing machine;
   d. counter means coupled to said static memory means and utilizing said timing pulses for addressing digital code words in said static memory means in said predetermined sequence beginning with said starting word identified by said switch means signal;
   e. means effective automatically to return said counter to a condition addressing said starting word identified by said switch means signal to repeat said predetermined sequence; and f. actuating means coupled to said static memory means and operatively connected to said stitch forming instrumentalities and responsive to said predetermined sequence of digitally coded words addressed by said counter means for influencing said stitch forming instrumentalities to form a pattern in response thereto.

2. A multiple pattern sewing machine according to claim 1 wherein said plural switch means operates to selectively render effective a specifically different portion of said multiplicity of separate digital code words to form a pattern by selectively identifying the addresses of the first and the last digital code words of a pattern between which said counter means is adapted to render code words effective in said predetermined sequence.

3. A multiple pattern sewing machine saving instrumentalities for forming a succession of stitches individually placed in a selected one of a plurality of different patterns, said sewing machine including:
a. static memory means in which a multiplicity of separate addresses exist in a predetermined sequence each address being capable of storing a digital code word corresponding to the positional coordinates of one individually placed stitch in a pattern,
b. a plurality of identical switch means arranged accessible to a sewing machine operator on said sewing machine, each said switch means coupled to said static memory means and effective when actuated individually to render effective a unique group of addresses which group of addresses is in said predetermined sequence and which does not share an address with a group rendered effective by actuation individually of any other of said switch means;
c. means for providing timing pulses related to the formation of successive stitches formed by said sewing machine;
d. counter means coupled to said static memory means and utilizing said timing pulses for addressing in said predetermined sequence the unique group of addresses rendered effective by actuation individually of said switch means;
e. means for resetting said counter means upon completion of each predetermined sequence of said addressing; and
f. actuating means coupled to said stitch forming instrumentalities and responsive to said predetermined sequence of digitally coded words stored in said unique group of addresses in said static memory means for influencing said stitch forming instrumentalities to form a recurring selected pattern of stitches in response thereto.

4. A multiple pattern sewing machine having instrumentalities for forming a succession of stitches individually placed in a selected one of a plurality of different patterns, said sewing machine including:
a. means for producing timing pulses related to the formation of successive stitches formed by said sewing machine;
b. static memory means for storing a plurality of digital code words each of which corresponds to one individually placed stitch within a pattern and an end indicating code word which indicates the end of a selected stitch pattern;
c. pattern selector means for selectively addressing any pattern code word other than an end indicating code word as the starting word of a selected pattern;
d. counter means coupled to said static memory means and utilizing said timing pulses for addressing in sequence successive code words of said static memory means; and
e. actuating means coupled to said static memory means and operatively connected to said stitch forming instrumentalities and responsive to said sequence of digitally coded words for influencing said stitch forming instrumentalities to form a pattern of stitches in response thereto.

5. A multiple pattern sewing machine having instrumentalities for forming a succession of stitches individually placed in a selected one of a plurality of different patterns, said sewing machine including:
a. means for producing timing pulses related to the formation of successive stitches formed by said sewing machine;
b. static memory means for storing a plurality of digital code words each of which corresponds to one individually placed stitch within a pattern and an end indicating code word which indicates the end of a selected stitch pattern;
c. pattern selector means for selectively addressing any selected pattern code word other than an end indicating code word as the starting word of a selected pattern;
d. counter means coupled to said static memory means and utilizing said timing pulses for addressing in sequence successive code words of said static memory;
e. detecting means coupled to said static memory means and said counter means and responsive to an end indicating code word for resetting said counter means to the first code word of a pattern as determined by said pattern selector means; and
f. actuating means coupled to said static memory means and operatively connected to said stitch forming instrumentalities and responsive to said sequence of digitally coded words for influencing said stitch forming instrumentalies in response thereto.

6. In a sewing machine having instrumentalities for forming a succession of stitches, a system for influencing the individual placement of said succession of stitches in a selected one of a plurality of different ornamental stitch patterns, said system including:
a. means for producing timing pulses related to the formation of successive stitches formed by said sewing machine;
b. static memory means for storing a plurality of digital code words in a predetermined sequence each at a different address and encompassing a plurality of stitch patterns each code word of which corresponds to one individually placed stitch;
c. pattern selector means for selectively identifying any one of said different addresses of said digital code words to define the starting word of a pattern of stitches;
d. means included in said system for determining the total number of said successively addressed digital code words stored in said static memory means to be included in each of said different patterns;

e. counter means coupled to said static memory means and utilizing said timing pulses for addressing in sequence those successive code word addresses in said static memory means from the address of said starting word selectively addressed by said pattern selector means and through the total number of said successively addressed code words delineated by said code word number determining means; and f. actuating means coupled to said static memory means and operatively connected to said stitch forming instrumentalities and responsive to said sequence of digitally coded words for influencing said stitch forming instrumentalities in response thereto.

7. A multiple pattern sewing machine having instrumentalities for forming a succession of stitches individually placed in a selected one of a plurality of different patterns, said sewing machine including:

a. means for producing timing pulses related to the formation of successive stitches formed by said sewing machine;

b. static memory means for storing a plurality of digital code words each at a different address each of which corresponds to one individually placed stitch within a pattern;

c. pattern selector means for selectively identifying any one of said different addresses to define the starting word of a selected pattern and for simultaneously selecting the number of said successively addressed digital code words in the static memory means which will constitute the selected pattern;

d. counter means coupled to said static memory means and utilizing said timing pulses for addressing in sequence successive code word addresses of said static memory from the address of said starting word through that number of code word addresses which constitutes the selected pattern; and e. actuating means coupled to said static memory means and operatively connected to said stitch forming instrumentalities and responsive to said sequence of addressed digitally coded words for influencing said stitch forming instrumentalities in response thereto.

* * * * *